United States Patent
Bar-Ness et al.

(10) Patent No.: US 8,355,426 B2
(45) Date of Patent: Jan. 15, 2013

(54) DECODING DATA TRANSMITTED USING SPACE-TIME SPREADING IN A WIRELESS COMMUNICATION SYSTEM

(75) Inventors: Yeheskel Bar-Ness, Marlboro, NJ (US); Kodzovi Acolatse, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 889 days.

(21) Appl. No.: 12/430,788

(22) Filed: Apr. 27, 2009

(65) Prior Publication Data

US 2010/0272160 A1  Oct. 28, 2010

(51) Int. Cl.
*H04B 1/00* (2006.01)
(52) U.S. Cl. ........ 375/147; 375/146; 375/150; 375/152; 375/267; 375/260; 375/285; 375/295; 375/299; 375/224; 375/227; 375/228
(58) Field of Classification Search .......... 375/147, 375/146, 150, 152, 267, 260, 285, 295, 299, 375/224, 227, 228
See application file for complete search history.

(56) References Cited

U.S. PATENT DOCUMENTS

| | | | |
|---|---|---|---|
| 2003/0016640 A1* | 1/2003 | Onggosanusi et al. | 370/335 |
| 2004/0120274 A1* | 6/2004 | Petre et al. | 370/320 |
| 2007/0141990 A1 | 6/2007 | Zeng | |
| 2009/0041145 A1* | 2/2009 | Chockalingam et al. | 375/261 |

FOREIGN PATENT DOCUMENTS

| | | |
|---|---|---|
| EP | 1422862 A1 | 5/2004 |
| EP | 1422862 A2 | 5/2004 |
| WO | 0199329 A1 | 12/2001 |
| WO | WO 01/99329 A1 | 12/2001 |
| WO | 2008054172 A2 | 5/2008 |
| WO | WO 2008/054172 A1 | 5/2008 |
| WO | 2008088194 A1 | 7/2008 |
| WO | WO 2008/088194 A1 | 7/2008 |

OTHER PUBLICATIONS

Siavash M. Alamouti, A simple transmit diversity technique for wireless communications, IEEE Journal on Select Areas Communications, Oct. 1998, pp. 1451-1458, vol. 16 No. 8.
Vahid Tarokh, Hamid Jafarkhani, A. Robert Calderbank, Space-Time Block Coding for Wireless Communications: Performance Results, IEEE Journal on Selected Areas of Communications, Mar. 1999, pp. 451-460, vol. 17 No. 3.
Antony Vielmon, Ye (Geoffrey) Li, John R. Barry, Performance of Alamouti Transmit Diversity Over Time Varying Rayleigh-Fading Channels, IEEE Transactions on Wireless Communications, Sep. 2004, vol. 3 No. 5.
Himal A. Suraweera, Jean Armstrong, Alamouti Coded OFDM in Rayleigh Fast Fading Channels—Receiver Performance Analysis, IEEE Transactions on Wireless Communications, Sep. 2004, pp. 1369-1373, vol. 3 Is. 5, Melbourne Victoria, Australia.
Zhiqiang Liu, Xiaoli Ma, Georgios B. Giannakis, Space-Time Coding and Kalman Filtering for Time-Selective Fading Channels, IEEE Transactions on Communications, Feb. 2002, pp. 183-186, vol. 50 Is. 2.

(Continued)

*Primary Examiner* — Siu Lee

(57) ABSTRACT

Examples are disclosed for determining a bit error rate (BER) associated with decoding data transmitted using space-time spreading (STS) in a wireless communication system.

30 Claims, 7 Drawing Sheets

OTHER PUBLICATIONS

Ding-Bing Lin, Ping-Hung Chiang, Hsueh-Jyh Li, Performance Analysis of Two-Branch Transmit Diversity Block-Coded OFDM Systems in Time-Varying Multipath Rayleigh-Fading Channels, IEEE Transactions on Vehicular Technology, Jan. 2005, pp. 136-148, vol. 54 Is. 1.

Bertrand Hochwald, Thomas L. Marzetta, Constantinos B. Papadias, A Transmitter Diversity Scheme for Wideband CDMA Systems Based on Space-Time Spreading, IEEE Journal on Selected Areas of Communications, Jan. 2001, pp. 48-60, vol. 19 No. 1.

Walaa Hamouda, Mohamed Aljerjawi, A Transmit Diversity Scheme using Space-Time Spreading for DS-CDMA Systems in Rayleigh Fading Channels, IEEE Vehicular Technology Conference, Sep. 2005, pp. 147-151, Dallas, TX, USA.

Mohamed Aljerjawi, Walaa Hamouda, Performance of Space-Time Spreading in Multiuser DS-CDMA Systems over Fast-Fading Channels, IEEE Global Telecommunications Conference, Nov. 28-Dec. 2, 2005, pp. 5, St. Louis, MO, USA.

Mohamed Aljerjawi, Walaa Hamouda, Performance Analysis of Multiuser MIMO CDMA Systems in Fast-Fading Channels, IEEE Global Telecommunications Conference, Nov. 27-Dec. 1, 2006, pp. 1-6, San Francisco, CA, USA.

Jian Cui, Asrar U.H. Sheikh, David D. Falconer, Ber Analysis of Optimum Combining and Maximal Ration Combining with Channel Correlation for Duel Antenna Systems, IEEE 47th Vehicular Technology Conference, May 4-7, 1997, pp. 150-154, Phoenix, AZ, USA.

Mohamed Aljerjawi, Walaa Hamouda, Performance Analysis of Transmit Diversity in Multiuser DS-CDMA Systems over Quasi-Static Fading Channels, IEEE 64th Vehicular Technology Conference, Sep. 25-28, 2006, pp. 1-4, Montreal, Canada.

Australian Patent Office, Written Opinion of the International Searching Authority for PCT/US2010/001235, mailed on Jun. 16, 2010, Australia.

* cited by examiner

700 A computer program product.

702 A signal bearing medium.

704 programming instructions for determining a bit error rate associated with a receiver decoding data encoded in a first symbol and a second symbol, the first symbol and the second symbol further included in both a first chip block and a second chip block, the first chip block and the second chip block transmitted over a communication channel during a first symbol time period through a first antenna and a second antenna of a transmitter, the first chip block and the second chip block also transmitted over the communication channel during a second symbol time period through the first antenna and the second antenna of the transmitter, which, when executed by logic, cause the logic to:

obtain an input signal-to-noise ratio operating parameter for the receiver to receive the encoded data via the communication channel during the first symbol time period and the second symbol time period;

obtain a channel correlation coefficient for the communication channel, the channel correlation coefficient based on a variation of the communication channel between the first symbol time period and the second symbol time period; and determine a bit error rate associated with the receiver decoding data encoded in the first symbol and the second symbol, wherein the bit error rate is determined based on the input signal-to-noise ratio operating parameter and the channel correlation coefficient.

| 706 a computer-readable medium. | 708 a recordable medium. | 710 a communications medium. |

FIG. 7

DECODING DATA TRANSMITTED USING SPACE-TIME SPREADING IN A WIRELESS COMMUNICATION SYSTEM

BACKGROUND

Unless otherwise indicated herein, the approaches described in this section are not prior art to the claims in this application and are not admitted to be prior art by inclusion in this section.

A type of wireless communication system using multiple antennas to transmit copies of a data stream across a number of antennas may be referred to as a transmit diversity wireless communication system. A transmit diversity wireless communication system may space-time modulate encoded portions of a data stream (e.g., encoded data blocks) to improve reliability of data-transfer between a transmitter and a receiver. A typical scheme to space-time modulate an encoded data block may include first and second periods of time over which a first copy of an encoded data block is transmitted from a first antenna and a second copy of the encoded data block is transmitted from a second antenna via a communication channel. The encoded block may be spread using orthogonal spreading codes. This type of space-time modulating of an encoded spread data block may be referred to as space-time spreading (STS).

Some transmit diversity wireless communication systems using STS may be designed with an assumption that a communication channel is at least quasi-static (e.g., has little to no variation or is substantially correlated) between each period of time over which copies of encoded data are transmitted. However, the present disclosure recognizes and appreciates that communication channels may undergo natural time variations caused by a physical environment in which the wireless communication channel is to be employed (e.g., effects of scattering, reflection, refraction, etc.). Further, rapid relative movement between a transmitter and a receiver may cause communication signals associated with a wireless communication channel to rapidly fade and thus further change or cause variations in the communication channel between transmit time periods. As a result of natural time variations and rapidly fading environments, reliability of data-transfer between a transmitter and a receiver can be problematic in a transmit diversity wireless communication system using STS that is designed with an assumption that a communication channel is quasi-static.

Some attempts to design a transmit diversity wireless communication system using STS that may account for variations in a communication channel assume that variations in the communication channel occur independently or have no correlation. However, variations in the communication channel may have some correlation. A correlation may decrease when a communication channel is employed in a rapidly fading environment. As a result of the existence of time correlation in a wireless channel, reliability of data-transfer between a transmitter and a receiver may also be problematic in a transmit diversity wireless communication system using STS that is designed under an assumption of no correlation between transmit time periods.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 illustrates a block diagram of an example computer program product; and

DETAILED DESCRIPTION

Figure 1:
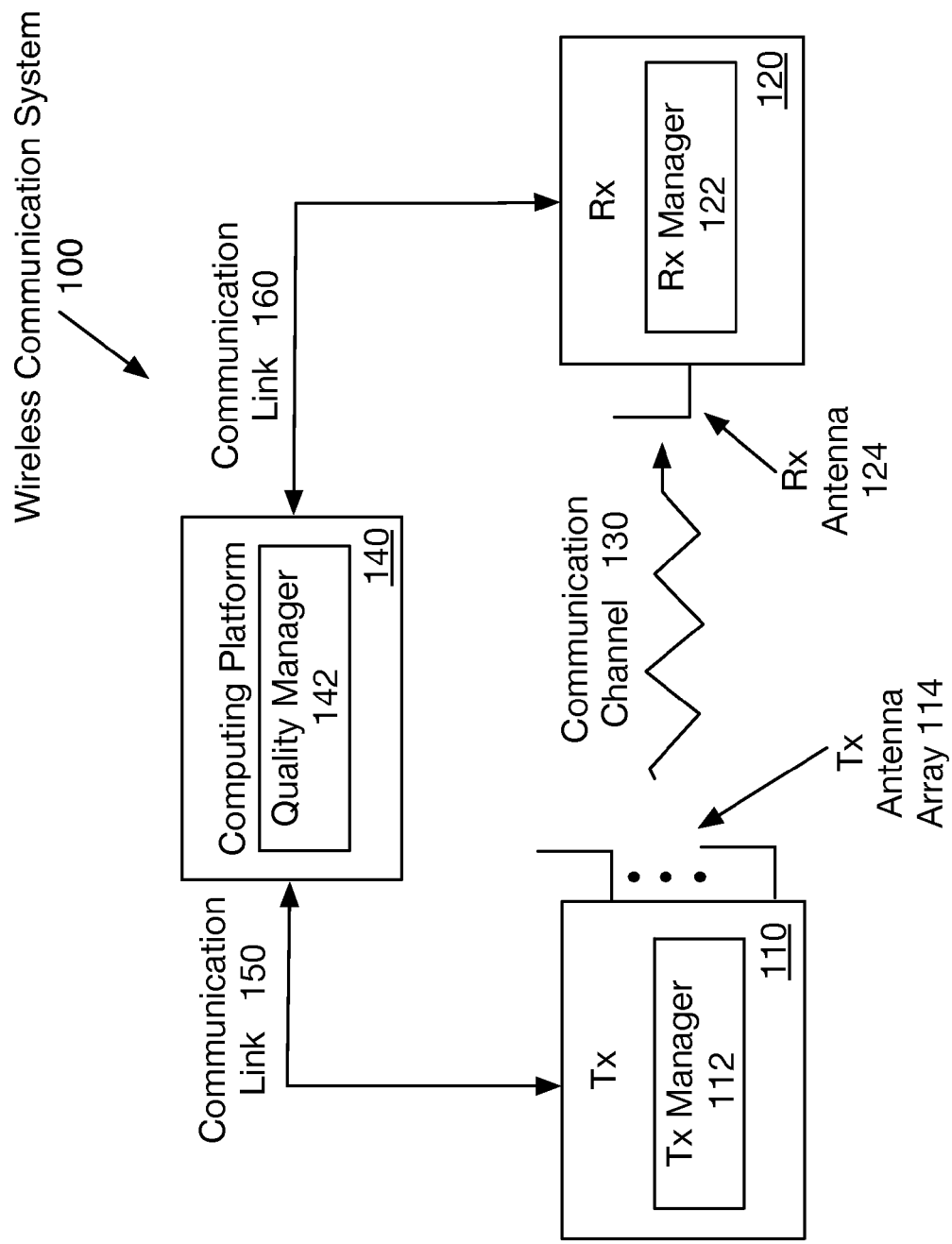
FIG. 1 illustrates an example wireless communication system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to determining a bit error rate (BER) associated with decoding data transmitted using space-time spreading (STS) in a wireless communication system.

As contemplated in the present disclosure, a transmit diversity wireless communication system using STS may be designed with an assumption that a communication channel has little to no variation (e.g., quasi-static) or variations are independent (e.g., substantially uncorrelated). However, as contemplated in the present disclosure, these two design assumptions can be problematic to reliability of data-transfer between a transmitter and a receiver. Further, as transmit diversity wireless communication systems using STS seek to improve on the quality of data-transfers, inaccurate assumptions of communication channel variations can pose a significant challenge to these sought after quality improvements.

Examples of a transmit diversity wireless communication system using STS that would benefit from removing inaccurate assumptions about communication channel variations include a transmit diversity wireless communication system that employs a direct-sequence code-division-multiple-access (DS-CDMA) access methodology. A DS-CDMA employment for a transmit diversity wireless communication system using STS may encode data in symbols and include the symbols in chip blocks based on orthogonal spreading codes. Chip blocks may be transmitted from multiple antennas over a communication channel during separate periods of time referred to as symbol time periods. For example, a first and a second chip block may be transmitted from a first antenna and a second antenna during a first symbol time period. The first and the second chip blocks may then be transmitted from the first and the second antenna during a second symbol time period. In this DS-CDMA employment, the communication channel via which the first and second chip blocks are received may be associated with or characterized by a fast-fading correlated channel model, e.g., a Rayleigh fast fading model or a Rician fast fading model.

In some examples, methods are implemented for determining a BER associated with a receiver decoding data encoded in a first symbol and a second symbol, the first and the second symbols further included in both a first chip block and a second chip block. The first chip block and the second chip block may have been transmitted over a communication channel during a first symbol time period through a first antenna and a second antenna of a transmitter. The first chip block and the second chip block may have also been transmitted over the communication channel during a second symbol time period through the first antenna and the second antenna of the transmitter. According to the methods, an input signal-to-noise ratio operating parameter for the receiver to receive encoded data via the communication channel during the first symbol time period and the second symbol time period is obtained. Also, according to the methods, a channel correlation coefficient for the communication channel may be obtained. The channel correlation coefficient may be based on a variation of the communication channel between the first symbol period and the second symbol period. A BER associated with the receiver decoding data encoded in the first symbol and the second symbol may then be determined. The BER may be determined based on the obtained input signal-to-noise ratio operating parameter and the obtained channel correlation coefficient.

FIG. 1 illustrates an example wireless communication system 100. As shown in FIG. 1, wireless communication system 100 includes transmitter 110, receiver 120 and computing platform 140. In some examples, the elements of wireless communication system 100 may be coupled via communication links or channels. As depicted in FIG. 1 these communication links or channels may include communication channel 130 coupling transmitter 110 to receiver 120 and communication links 150 and 160 coupling computing platform 140 to transmitter 110 and receiver 120, respectively. Communication channel 130 may be a wireless communication channel and communication links 150 and 160 may include wireless and/or wired communication links.

In some examples, wireless communication system 100 may operate as a transmit diversity wireless communication system. For example, as shown in FIG. 1, transmitter 110 includes a transmit (Tx) manager 112 and a Tx antenna array 114. Tx antenna array 114 may include ith number of antennas, i=1, 2, etc. As described more below, Tx manager 112 may include logic configured to encode and transmit a data stream (hereinafter referred to as "data") using at least two antennas from transmit antenna array 114. The encoded data, for example, is transmitted to receiver 120 via communication channel 130. Receiver 120, for example, includes a receive (Rx) antenna 124 to receive the encoded data via communication channel 130, although this disclosure is not limited to a receiver including only one antenna. Receiver 120 may also include an Rx manager 122 having logic (described more below) configured to decode the received encoded data.

As shown in FIG. 1, wireless communication system 100 includes computing platform 140 having a quality manager 142. Quality manager 142 may include logic (described more below) configured to determine a bit error rate (BER) associated with receiver 120 decoding data received from transmitter 110. As mentioned above, encoded data may be transmitted via communication channel 130.

In some examples, wireless communication system 100 may employ a direct-sequence code-division-multiple-access (DS-CDMA) method of access to establish and/or maintain a communication channel, although this disclosure is not limited to only DS-CDMA methods. In a DS-CDMA employment, Tx manager 112 of Transmitter 110 may include logic configured to encode data in symbols and include the symbols in chip blocks based on orthogonal spreading codes. Chip blocks may then be transmitted during separate symbol time periods from two or more antennas of Tx antenna array 114 via a communication channel (e.g., communication channel 130). Rx manager 122 of receiver 120 may include logic and/or circuitry configured to receive the chip blocks transmitted over the communication channel from transmitter 110, and also may be configured to decode the data encoded in the symbols included in the received chip blocks.

Also as part of a DS-CDMA employment, in some examples, quality manager 142 of computing platform 140 may include logic configured to determine a BER associated with Rx manager 122 decoding the encode data transmitted from transmitter 110 via the communication channel. For example, to determine a BER, quality manager 142 may obtain an input signal-to-noise ratio operating parameter for receiver 120 to receive the encoded data from transmitter 110. Quality manager 142 may also be arranged to obtain a channel correlation coefficient for the communication channel. The channel correlation coefficient for the communication channel may be based on a variation of the communication channel between symbol time periods. For example, natural time variations and/or relative movements of transmitter 110 and receiver 120 may cause the variation of the communication channel, although this disclosure is not limited to only these possible causes of variations in a communication channel. Quality manager 142 may then use the obtained input signal-to-noise ratio operating parameter, and the obtained channel correlation coefficient as inputs to an algorithm or equation to determine the BER.

Figure 2:
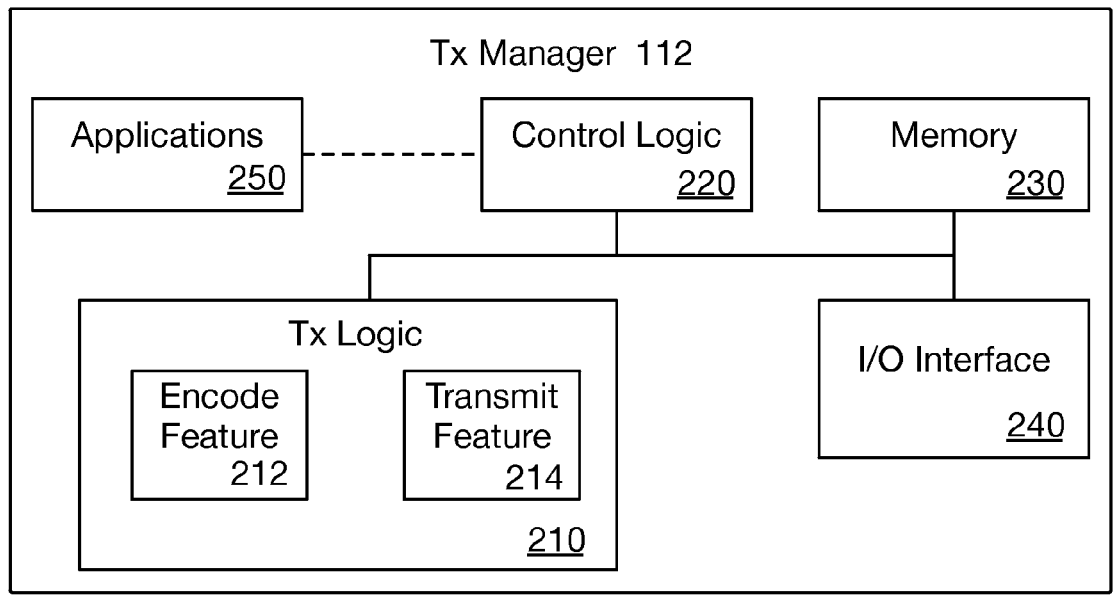
FIG. 2 illustrates a block diagram of an example architecture for a transmit manager.

FIG. 2 illustrates a block diagram of an example architecture for a transmit (Tx) manager 112. As described above for wireless communication system 100 in FIG. 1, transmitter 110 includes Tx manager 112. In some examples, Tx manager 112 includes features and/or logic configured or arranged to encode and transmit data from antenna array 114 via a communication channel (e.g., communication channel 130).

The example Tx manager 112 of FIG. 2, includes Tx logic 210, control logic 220, memory 230, input/output (I/O) interfaces 240 and optionally one or more applications 250. As illustrated in FIG. 2, Tx logic 210 is coupled to control logic 220, memory 230 and I/O interface 240. Also illustrated in FIG. 2, the optional applications 250 are arranged in cooperation with control logic 220. Tx logic 210 may further include an encode feature 212 and a transmit feature 214.

In some examples, the elements portrayed in FIG. 2's block diagram are configured to support or enable Tx manager 112 as described in this disclosure. A given Tx manager 112 may include some, all or more elements than those depicted in FIG. 2. For example, Tx logic 210 and control logic 220 may separately or collectively represent a wide variety of logic device(s) to implement the features of Tx manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, Tx logic 210 includes encode feature 212 and transmit feature 214. As described more below, Tx logic 210 may be configured to use these features to perform operations. Example operations may include one or more of encoding data (e.g., in symbols) and transmitting the encoded data (e.g., via chip blocks) from two or more antennas from Tx antenna array 114 via a communication channel during separate time periods (e.g., symbol time periods).

In some examples, control logic 220 may be configured to control the overall operation of Tx manager 112. As mentioned above, control logic 220 may represent any of a wide variety of logic device(s) configured to operate in conjunction with executable content or instructions to implement the control of Tx manager 112. In some alternate examples, the features and functionality of control logic 220 may be implemented within Tx logic 210.

According to some examples, memory 230 is arranged to store executable content or instructions. The executable content or instructions may be used by control logic 220 and/or Tx logic 210 to implement or activate features or elements of Tx manager 112. Memory 230 may also be arranged to temporarily maintain data to be encoded and transmitted from transmitter 110.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between Tx manager 112 and elements resident on or located with transmitter 110. I/O interfaces 240 may include interfaces that operate according to various communication protocols to communicate over the internal communication link (e.g., Inter-Integrated Circuit ($I^2C$), System Management Bus (SMBus) or Serial Peripheral Interface Bus (SPI), etc.). I/O interfaces 240 may also provide an interface between Tx manager 112 and elements coupled to transmitter 110 such as receiver 120 and computing platform 140. As mentioned above for FIG. 1, transmitter 110 may couple to these elements via communication link 150 and communication channel 130. The I/O interfaces 240, for example, include an interface configured to operate according to various wired or wireless communication protocols to allow Tx manager 112 to communicate over communication link 150 or communication channel 130 (e.g., CDMA2000, Ethernet, Universal Serial Bus (USB), etc.).

In some examples, Tx manager 112 includes one or more applications 250 to provide instructions to control logic 220 and/or Tx logic 210.

Figure 3:
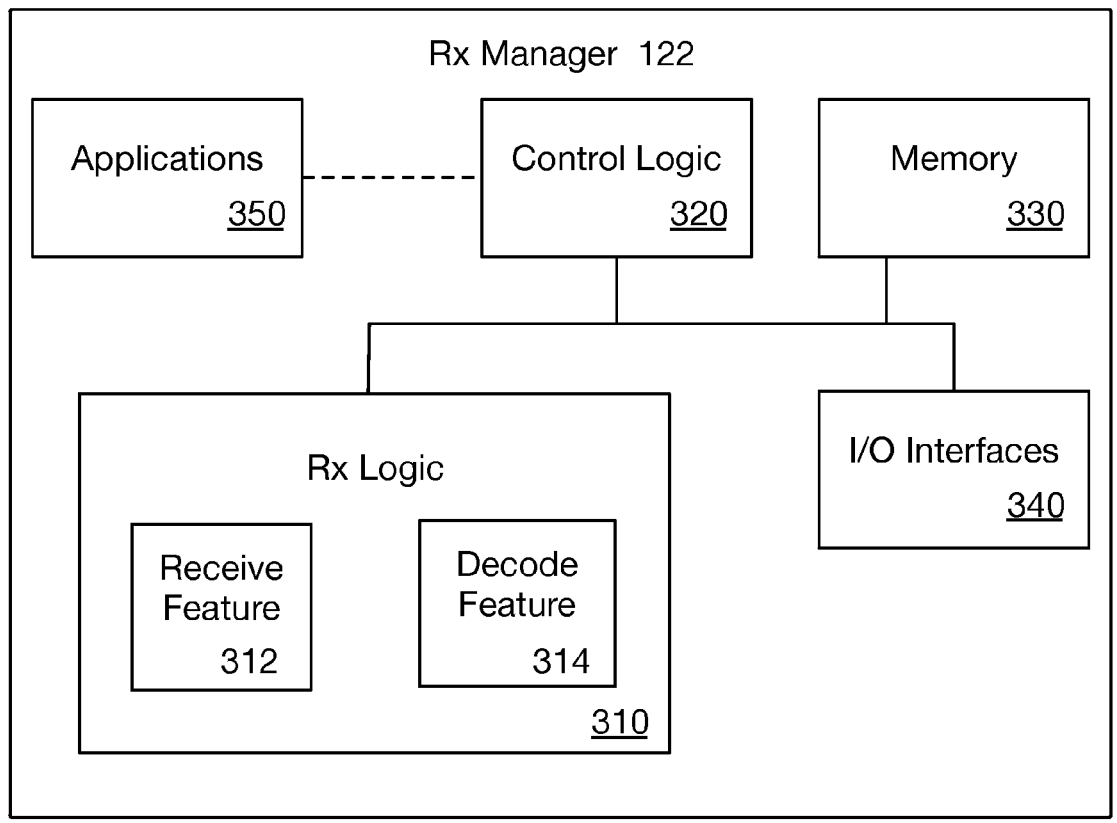
FIG. 3 illustrates a block diagram of an example architecture for a receive manager.

FIG. 3 illustrates a block diagram of an example architecture for a receiver (Rx) manager 122. As described above for wireless communication system 100 in FIG. 1, receiver 120 includes Rx manager 122. In some examples, Rx manager 122 includes features and/or logic configured or arranged to receive encoded data transmitted from transmitter 110 via a communication channel (e.g., communication channel 130) and also configured or arranged to decode the received encoded data.

The example Rx manager 122 of FIG. 3, includes Rx logic 310, control logic 320, memory 330, input/output (I/O) interfaces 340 and optionally one or more applications 350. As illustrated in FIG. 3, Rx logic 310 is coupled to control logic 320, memory 330 and I/O interface 340. Also illustrated in FIG. 3, the optional applications 350 are arranged in cooperation with control logic 320. Rx logic 310 may further include a decode feature 312 and a receive feature 314.

In some examples, the elements portrayed in FIG. 3's block diagram are configured to support or enable Rx manager 122 as described in this disclosure. A given Rx manager 122 may include some, all or more elements than those depicted in FIG. 3. For example, Rx logic 310 and control logic 320 may separately or collectively represent a wide variety of logic device(s) to implement the features of Rx manager 122. As mentioned previously, an example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 3, Rx logic 310 includes receive feature 312 and decode feature 314. As described more below, Rx logic 310 may be configured to use these features to perform operations. Example operations may include one or more of receiving encoded data (e.g., from transmitter 110 via communication channel 130) and also to decoding the received encoded data.

In some examples, control logic 320 may be configured to control the overall operation of Rx manager 122. As mentioned above, control logic 320 may represent any of a wide variety of logic device(s) configured to operate in conjunction with executable content or instructions to implement the control of Rx manager 122. In some alternate examples, the features and functionality of control logic 320 may be implemented within Rx logic 310.

According to some examples, memory 330 is arranged to store executable content or instructions. The executable content or instructions may be used by control logic 320 and/or Rx logic 310 to implement or activate features or elements of Rx manager 122. Memory 330 may also be arranged to temporarily maintain decoded data (e.g., received from transmitter 110) or to temporarily maintain operating parameters to include input signal-to-noise ratios for receiving encoded data.

Memory 330 may include a wide variety of memory media including, but not limited to, one or more of volatile memory, non-volatile memory, flash memory, programmable variables or states, RAM, ROM, or other static or dynamic storage media.

In some examples, I/O interfaces 340 may provide an interface via an internal communication medium or link between Rx manager 122 and elements resident on or located with receiver 120. The I/O interfaces 340 may include interfaces that operate according to various communication protocols to communicate over the internal communication link (e.g., $I^2C$, SMBus or SPI). I/O interfaces 340 may also provide an interface between Rx manager 122 and elements coupled to receiver 120 such as transmitter 110 and computing platform 140. As mentioned above for FIG. 1, receiver 110 may couple to these elements via communication link 160 and communication channel 130. I/O interfaces 340, for example, include an interface configured to operate according to various wired or wireless communication protocols to allow Rx manager 122 to communicate over communication link 160 or communication channel 130 (e.g., CDMA2000, Ethernet, USB, etc.).

In some examples, Rx manager 122 includes one or more applications 350 to provide instructions to control logic 320 and/or Rx logic 310.

Figure 4:
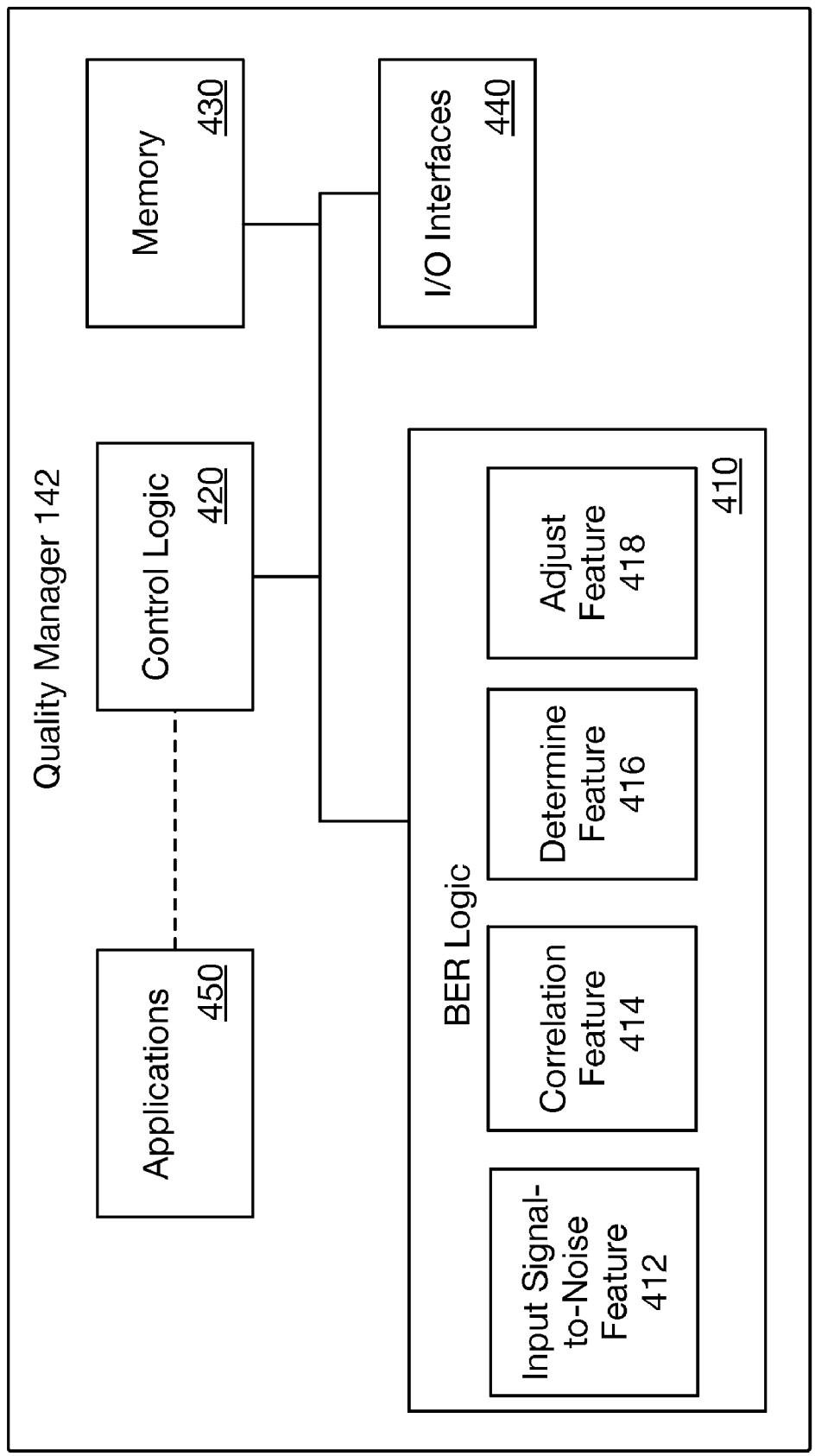
FIG. 4 illustrates a block diagram of an example architecture for a quality manager.

FIG. 4 illustrates a block diagram of an example architecture for a quality manager 142. As described above for wireless communication system 100 in FIG. 1, computing platform 140 includes quality manager 142. In some examples, quality manager 142 includes features and/or logic configured or arranged to determine a BER associated with a receiver (e.g., receiver 120) decoding data transmitted from a transmitter (e.g., transmitter 110) via a communication channel (e.g., communication channel 130).

The example quality manager 142 of FIG. 4 includes BER logic 410, control logic 420, memory 430, input/output (I/O) interfaces 440 and optionally one or more applications 450. As illustrated in FIG. 4, BER logic 410 is coupled to control logic 420, memory 430 and I/O interface 440. Also illustrated in FIG. 4, the optional applications 450 are arranged in cooperation with control logic 420. BER logic 410 may further include an input signal-to-noise feature 412, a correlation feature 414, a determine feature 416 and an adjust feature 418.

In some examples, the elements portrayed in FIG. 4's block diagram are configured to support or enable quality manager 142 as described in this disclosure. A given quality manager 142 may include some, all or more elements than those depicted in FIG. 4. For example, BER logic 410 and control logic 420 may separately or collectively represent a wide variety of logic device(s) or executable content to implement the features of quality manager 142. As mentioned previously, an example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 4, BER logic 410 includes input signal-to-noise feature 412, correlation feature 414, determine feature 416 and adjust feature 418. BER logic 410 may be configured to use these features to perform operations. As described more below, example operations may include one or more of obtaining information to include an input signal-to-noise ratio operating parameter for a receiver (e.g., receiver 120) to receive encoded data via a communication channel (e.g., communication channel 130), obtaining a channel correlation coefficient for the communication channel and determining a BER associated with the receiver decoding the received encoded data based on the obtained information. The example operations may also include adjusting or modifying operating parameters based on the determined BER.

In some examples, control logic 420 may be configured to control the overall operation of quality manager 142. As mentioned above, control logic 420 may represent any of a wide variety of logic device(s) configured to operate in conjunction with executable content or instructions to implement the control of quality manager 142. In some alternate examples, the features and functionality of control logic 420 may be implemented within BER logic 410.

According to some examples, memory 430 is arranged to store executable content or instructions. The executable content or instructions may be used by control logic 420 and/or BER logic 410 to implement or activate features or elements of quality manager 142. Memory 430 may also be arranged to temporarily maintain information (e.g., input signal-to-noise ratio(s), channel correlation coefficient(s), etc.). The maintained information may be used to determine one or more BERs for a receiver to decode encoded data transmitted from a transmitter via a communication channel. Memory 430 may also be arranged to temporarily maintain the one or more BER determinations.

Memory 430 may include a wide variety of memory media including, but not limited to, one or more of volatile memory, non-volatile memory, flash memory, programmable variables or states, RAM, ROM, or other static or dynamic storage media.

In some examples, I/O interfaces 440 may provide an interface via an internal communication medium or link between quality manager 142 and elements resident on or located with receiver 120. The I/O interfaces 440 may include interfaces that operate according to various communication protocols to communicate over the internal communication link (e.g., $I^2C$, SMBus, SPI, etc.). The I/O interfaces 440 may also provide an interface between quality manager 142 and elements coupled to computing platform 140 such as transmitter 110 and receiver 120. As mentioned above for FIG. 1, computing platform 140 may couple to these elements via communication links 150 and 160. I/O interfaces 440, for example, include an interface configured to operate according to various wired and/or wireless communication protocols to allow quality manager 142 to communicate over communication links 150 or 160 (e.g., CDMA2000, Ethernet, USB, etc.).

In some examples, quality manager 142 includes one or more applications 450 to provide instructions to control logic 420 and/or BER logic 410.

In some examples, quality manager 142 may determine one or more BERs associated with a receiver decoding data transmitted from a transmitter via a communication channel based one or more equations or algorithms. The one or more equations may consider a transmit diversity wireless communication system that employs a DS-CDMA access methodology and further uses STS to transmit encoded data via a communication channel. For this example, a pair of chip blocks $x_1$ and $x_2$ are transmitted via a communication channel characterized as a time varying and frequency flat Raleigh fading channel. Let $h_i^{(k)}$, i=1, 2 denote the complex channel impulse response between a Rx antenna of a receiver and the $i^{th}$ Tx antenna of a transmitter during a $k^{th}$ symbol time period to transmit encoded data via a communication channel. It may be assumed that each $h_i^{(k)}$ are identically distributed, zero-mean with unit variance, i.e. $E[|h_i^{(k)}|^2]=1, \forall i,k$. The Tx antennas are sufficiently separated so that $h_1^{(k)}$ is independent of $h_2^{(k)}$. A type of communication channel model known as a Jakes' channel model may also be used to characterize the communication channel in relation to each Tx antenna. Also, an assumption may be made that possible signal fading for the communication channel is temporally symmetric such that the fading autocorrelation function for i=1, 2 is the $zero^{th}$-order Bessel function ($J_0$) of the first kind. Example equation (1) is an equation for determining a channel correlation coefficient ρ for the communication channel based on the assumptions and models mentioned above.

$$\rho = E[h_i^{(k)} h_i^{(k+1)*}] = J_0(2\pi f_D T_s) \qquad (1)$$

For example equation (1), $T_s$ is the symbol time period and $f_D$ is the maximum Doppler spread. For example equation (1), perfect channel knowledge may be available at the receiver only. Transmitted signals from Tx antenna one and two, respectively, are represented by the chip blocks $x_1$ and $x_2$ and are depicted in example equation (2).

$$x_1 = s_1 c_1 - s_2^* c_2$$

$$x_2 = s_2 c_1 + s_1^* c_2 \qquad (2)$$

For example equation (2), $s_1$ and $s_2$ represent copies of encoded data that may be included in chip blocks $x_1$ and $x_2$ with $E[|s_i|^2] = E_s$. Also for example equation (2), $c_1$ and $c_2$ represent first and second orthogonal spreading codes that may be used to include $s_1$ and $s_2$ in both chip blocks $x_1$ and $x_2$. The received signal corresponding to the $k^{th}$ and $(k+1)^{th}$ symbol time periods are respectively given by example equation (3).

$$r^{(k)} = h_1^{(k)} x_1 + h_2^{(k)} x_2 + w^{(k)}$$

$$r^{(k+1)} = h_1^{(k+1)} x_1 + h_2^{(k+1)} x_2 + w^{(k+1)} \quad (3)$$

For example equation (3), $w^{(k)}$ represents the zero mean circularly symmetric additive white Gaussian noise (AWGN) with variance $N_o$ added to the $k^{th}$ received signal. The same chip blocks, for example, are transmitted during the two consecutive symbol time periods. By multiplying the received signals $r^{(k)}$ of example equation (3) by the orthogonal spreading codes $c_1^T$ and $c_2^T$ respectively, example equation (4) is the result.

$$z_1^{(k)} = r^{(k)} c_1^T = h_1^{(k)} s_1 + h_2^{(k)} s_2 + n_1^{(k)}$$

$$z_2^{(k)} = r^{(k)} c_2^T = h_1^{(k)} s_2{}^* + h_2^{(k)} s_1{}^* + n_2^{(k)} \quad (4)$$

Similar to example equation (4), by multiplying the received signals $r^{(k+1)}$ of example equation (3) by the orthogonal spreading codes $c_1^T$ and $c_2^T$ respectively, example equation (5) is the result.

$$z_1^{(k+1)} = r^{(k+1)} c_1^T = h_1^{(k+1)} s_1 + h_2^{(k+1)} s_2 + n_1^{(k+1)}$$

$$z_2^{(k+1)} = r^{(k+1)} c_2^T = -h_1^{(k+1)} s_2{}^* + h_2^{(k+1)} s_1{}^* + n_2^{(k+1)} \quad (5)$$

In example equations (4) and (5), the orthogonality of the spreading code, i.e. $c_i c_i^T = 1$ and $c_i c_j^T = 0$, $\forall i \neq j$ were used. The receiver may perform signal combining for the $k^{th}$ receiver signal according to example equation (6).

$$\begin{aligned} y_1^{(k)} &= h_1^{(k)*} z_1^{(k)} + h_2^{(k)} z_2^{(k)*} \\ &= \alpha_k^2 s_1 + h_1^{(k)*} n_1^{(k)} + h_2^{(k)} n_2^{(k)*} \\ y_2^{(k)} &= h_2^{(k)*} z_1^{(k)} - h_1^{(k)} z_2^{(k)*} \\ &= \alpha_k^2 s_2 + h_2^{(k)*} n_1^{(k)} - h_1^{(k)} n_2^{(k)*} \end{aligned} \quad (6)$$

For the $(k+1)^{th}$ received signal, the receiver may perform signal combining according to example equation (7).

$$\begin{aligned} y_1^{(k+1)} &= h_1^{(k+1)*} z_1^{(k+1)} + h_2^{(k+1)} z_2^{(k+1)*} \\ &= \alpha_{k+1}^2 s_1 + h_1^{(k+1)*} n_1^{(k+1)} + h_2^{(k+1)} n_2^{(k+1)*} \\ y_2^{(k+1)} &= h_2^{(k+1)*} z_1^{(k+1)} - h_1^{(k+1)} z_2^{(k+1)*} \\ &= \alpha_{k+1}^2 s_2 + h_2^{(k+1)*} n_1^{(k+1)} - h_1^{(k+1)} n_2^{(k+1)*} \end{aligned} \quad (7)$$

For example equations (6) and (7), $\alpha_k^2 = |h_1^{(k)}|^2 + |h_2^{(k)}|^2$ and $a_{k+1}^2 = |h_1^{(k+1)}|^2 + |h_2^{(k+1)}|^2$. Further, combining example equations (6) and (7) by adding $y_i^{(k)}$ and $y_i^{(k+1)}$, example equation (8) is obtained.

$$\begin{aligned} \hat{s}_1 &= (\alpha_k^2 + \alpha_{k+1}^2) s_1 + h_1^{(k)*} n_1^{(k)} + h_2^{(k)} n_2^{(k)*} + \\ & \quad h_1^{(k+1)*} n_1^{(k+1)} + h_2^{(k)} n_2^{(k+1)*} \\ \hat{s}_2 &= (\alpha_k^2 + \alpha_{k+1}^2) s_2 + h_2^{(k)*} n_1^{(k)} + h_1^{(k)} n_2^{(k)*} + \\ & \quad h_2^{(k+1)*} n_1^{(k+1)} - h_1^{(k+1)} n_2^{(k+1)*} \end{aligned} \quad (8)$$

In some examples, the scheme described above achieves full rate as two symbols ($s_1$ and $s_2$) included in two chip blocks ($x_1$ and $x_2$) are transmitted in two symbol time periods. From example equation (8), it can be shown that the input signal-to-noise ratio operating parameter at the receiver is given by example equation (9).

$$\begin{aligned} \mu &= (\alpha k + \alpha k + 1) \gamma_o \\ &= (|h_1^{(k)}|^2 + |h_2^{(k)}|^2 + |h_1^{(k+1)}|^2 + |h_2^{(k+1)}|^2) \gamma_o \end{aligned} \quad (9)$$

For example equation (9), $\gamma_o = E_s / N_o$. Since, as mentioned above for example equation (1), $h_i^{(k)}$ and $h_i^{(k+1)}$ are correlated with channel correlation coefficient $\rho$, a probability density function (pdf) of a random variable denoted as $\mu_i = (|h_i^{(k)}|^2 + |h_i^{(k+1)}|^2) \gamma_o$ can be found to be given by example equation (10).

$$f(\mu_i) = \frac{1}{2\gamma_o \rho} \left( e^{-\frac{\mu_i}{\gamma_o(1+\rho)}} - e^{-\frac{\mu_i}{\gamma_o(1-\rho)}} \right), \forall \rho \neq 0 \quad (10)$$

Since $h_1^{(k)}$ is independent of $h_2^{(k)} \forall k$, the random variables $\mu_1$ and $\mu_2$ are also independent; hence the pdf of the input signal-to-noise ratio $\mu = \mu_1 + \mu_2$ can be found as shown in example equation (11).

$$\begin{aligned} f(\mu) &= f(\mu_1) * f(\mu_2) \\ &= \int_0^\infty f(\mu_1) f(\mu - \mu_1) d\mu_1 \end{aligned} \quad (11)$$

For example equation (11), (*) denotes the linear convolution operation and which after some manipulations yields equation (12).

$$f(\mu) = \frac{1}{4\rho^2 \gamma_o^2} \left[ (\mu - \mu_o) e^{-\frac{\mu}{\gamma_o(1+\rho)}} + (\mu - \mu_o) e^{-\frac{\mu}{\gamma_o(1-\rho)}} \right] \quad (12)$$

For example equation (12), $$\mu_o = \frac{(1-\rho^2)\gamma o}{\rho}.$$

In some examples, the average BER, assuming binary phase-shift keying (BPSK) modulation, can then be found as shown in example equation (13).

$$P_b = \int_0^\infty Q(\sqrt{2\mu}) f(\mu) du \quad (13)$$

Example equation (14) may then be derived as shown below.

$$P_b = \frac{(1-\rho^2)}{8\rho^3} [(1-\rho)(1-\gamma_1) - (1+\rho)(1-\gamma_2)] + \\ \frac{1}{16\rho^2} [(1+\rho)^2 (1-\gamma_2)^2 (2+\gamma_2) + (1-\rho)^2 (1+\gamma_1)^2 (2-\gamma_1)] \quad (14)$$

In some examples, for $\rho \neq 0$, $\gamma_1$ and $\gamma_2$ of example equation (14) may be defined by example equation (15) as shown below.

$$\gamma_1 = \sqrt{\frac{1}{1+\frac{1}{\gamma_o(1-\rho)}}};\quad(15)$$

$$\gamma_2 = \sqrt{\frac{1}{1+\frac{1}{\gamma_o(1+\rho)}}}$$

Example equations (14) and (15) may be used to determine one or more BERs based on a range of channel correlation coefficients greater than 0 and less than 1. In other words, example equation (14) and (15) may be used when variations in the communication channel between symbol periods are at least partially correlated. However, in a static or quasi-static channel, where the channel does not change or vary during two symbol periods, i.e., if $\rho=1$, the BER determined by example equations (14) and (15) reduces to a BER determined by using example equation (16).

$$P_b = 1/4[1-\gamma]^2[2+\gamma] \quad (16)$$

For example equation (16), $$\gamma = \sqrt{\frac{1}{1+\frac{1}{2\gamma o}}}.$$

In some examples, if the variations in the communication channel are independent or are substantially uncorrelated from one symbol period to another, i.e., if $\rho=0$, the BER can be determined using example equation (17).

$$P_b = \left[\frac{1}{2}(1-\eta)\right]^4 \sum_{k=0}^{3} \binom{3+k}{k}\left[\frac{1}{2}(1+\eta)\right]^k \quad (17)$$

For example equation (17), $$\eta = \sqrt{\frac{\gamma o}{1+\gamma o}}.$$

Example equations (14)-(17) may be used to determine one or more BERs based on a range of communication channel correlation coefficients from a $\rho=0$ to a $\rho=1$ and based on input signal-to-noise ratios for a receiver to receive data via a communication channel associated with the range of communication channel coefficients.

Figure 5:
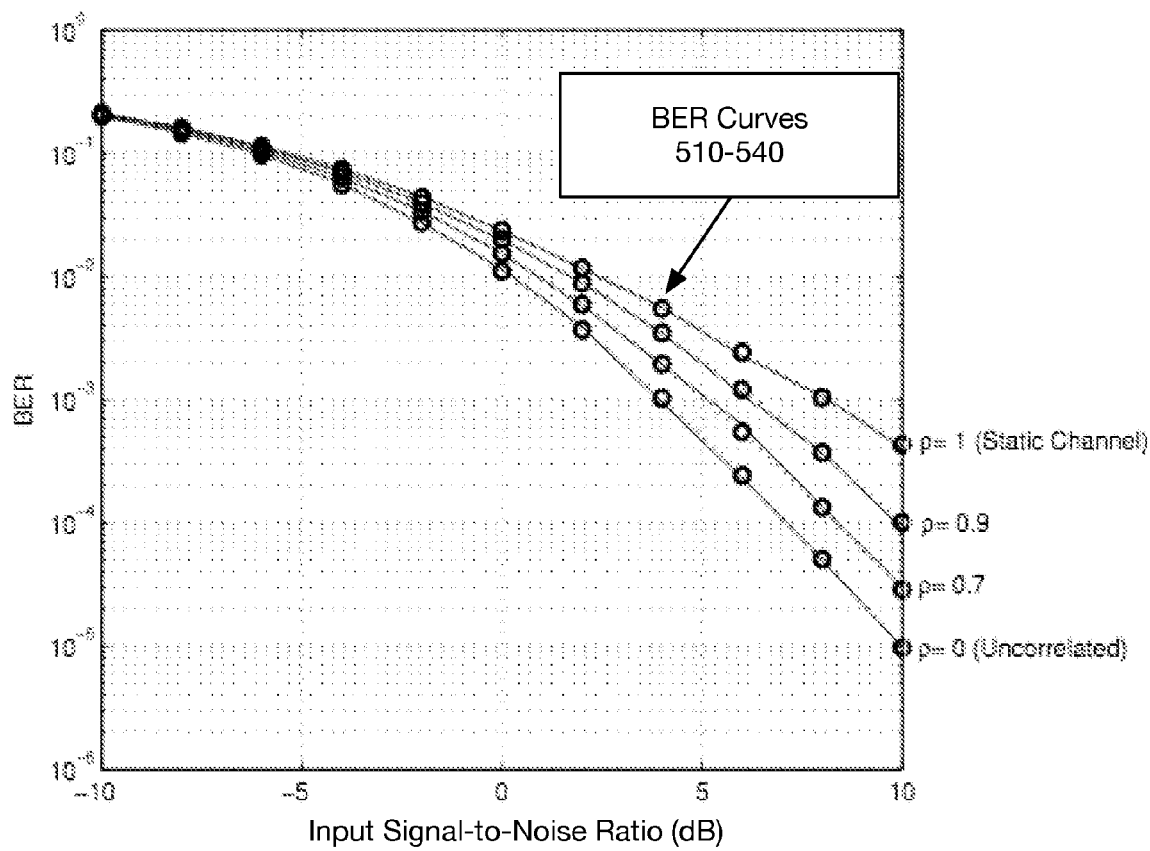
FIG. 5 illustrates an example graph depicting determined bit error rates.

FIG. 5 illustrates an example graph 500 depicting determined bit error rates (BERs). Graph 500 may be generated based on a transmit diversity wireless communication system that employs a DS-CDMA access methodology and further uses STS to transmit encoded data via a communication channel. As mentioned above, one or more of example equations (14)-(17) may be derived in this type of employment to determine one or more BERs. BER curves 510-540, as shown in FIG. 5, may graphically depict a BER based on four communication channel coefficients of $\rho=0$ $\rho=0.7$ $\rho=0.9$ and $\rho=1$ and a range of input signal-to-noise ratios from −10 decibels (dB) to 10 dB.

Figure 6:
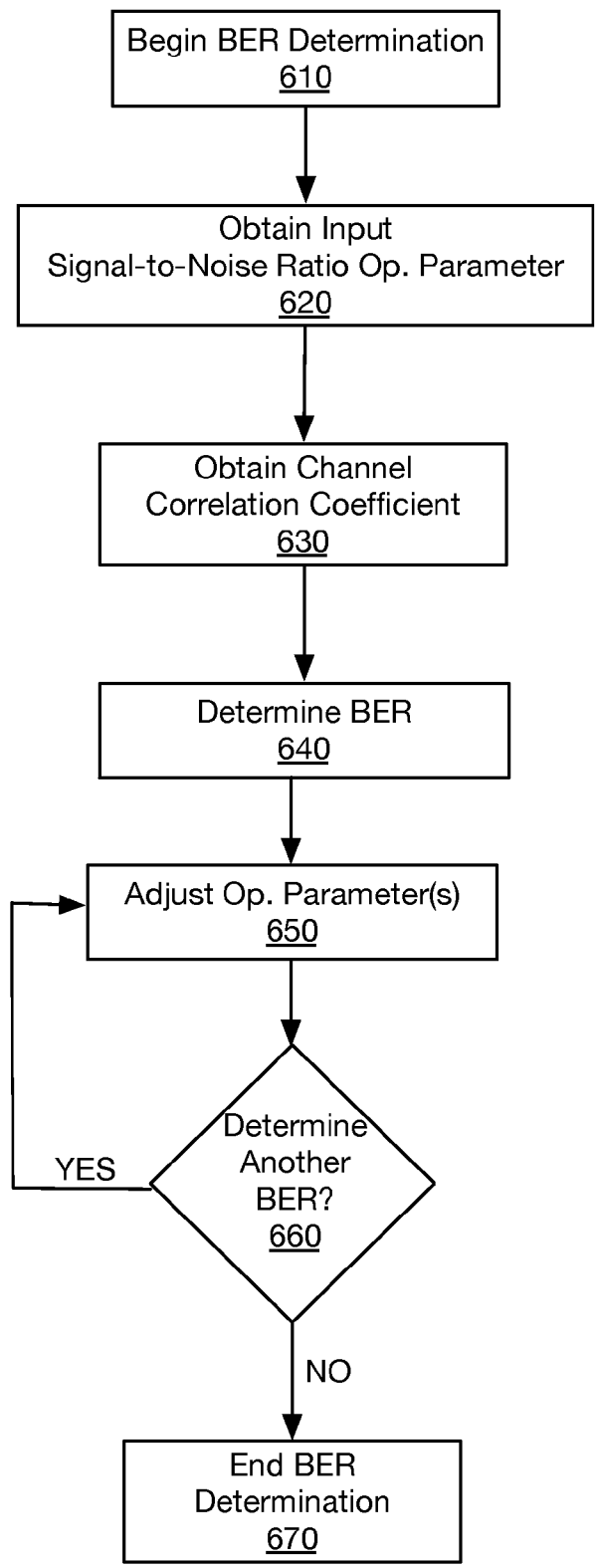
FIG. 6 illustrates a flow chart of example methods for determining a bit error rate associated with a receiver decoding data transmitted from a transmitter via a communication channel.

FIG. 6 illustrates a flow chart of example methods for determining a bit error rate (BER) associated with a receiver decoding data transmitted from a transmitter via a communication channel. In some examples, wireless communication system 100 as shown in FIG. 1, is used to illustrate example methods. A transmitter 110, receiver 120 and computing platform 140 having Tx, Rx, and quality managers, respectively, as shown in FIGS. 2-4, may also be used to illustrate example methods. But the described methods are not limited to only implementations on wireless communication system 100 as shown in FIG. 1 or to the various managers shown in FIGS. 2-4. The example methods may be implemented on other wireless communication systems having one or more of the elements depicted in FIGS. 1-4.

Processing begins at block 610 (Begin BER Determination), where one or more BERs associated with receiver 120 decoding data transmitted from transmitter 110 via communication channel 130 are to be determined. In some examples, a system designer for a wireless communication system may want to begin a BER determination in order to adjust or modify operating parameters (e.g., transmit signal strengths, receiver thresholds, acceptable input signal-to-noise ratios, acceptable receive/transmit data rates, etc.) based on the one or more determined BERs.

Processing continues from block 610 to block 620 (Obtain Input Signal-to-Noise Ratio Op. Parameter), where an input signal-to-noise ratio operating parameter for receiver 110 is obtained (e.g., via input signal-to-noise ratio feature 412) and temporarily maintained in a memory (e.g., memory 430). In some examples, the input signal-to-noise ratio operating parameter for receiver 110 may be received via communication link 160 from receiver 110. In some other examples, a system designer may assume a given input signal-to-noise ratio operating parameter based on the characteristics of receiver 110 (e.g., type of communication device, manufacturer, operating capabilities, anticipated operating environments etc.).

Processing continues to block 630 (Obtain Channel Correlation Coefficient) where the process obtains one or more communication channel correlation coefficients for communication channel 130 (e.g., via correlation feature 414). As mentioned above, communication channel correlation coefficients may range in value from a $\rho=0$ to a $\rho=1$. The one or more communication channel correlation coefficients for communication channel 130 may be temporarily maintained in a memory (e.g., memory 430).

Continuing to block 640 (Determine BER), where a BER is determined. In some examples, wireless communication system 100 employs a DS-CDMA access methodology and further uses STS to transmit encoded data via communication channel 130. A system designer may possibly use a computing platform 140 that includes a quality manager 142 having logic configured to implement one or more of example equations (14)-(17) to determine a BER. For example, determine feature 414 may use the input signal-to-noise ratio operating parameter for receiver 120 obtained in block 620 and one of the communication channel correlation coefficients obtained in block 630 as inputs to one or more of example equations (14)-(17) to determine the BER.

Proceeding to block 650 (Adjust Op. Parameter(s)), where one or more operating parameter are adjusted or modified (e.g., via adjust feature 418) based on the determined BER. In some examples, an operating parameter such as transmitter signal strength for one or more transmit antennas of Tx antenna array 114 of Tx 110 may be adjusted. The adjustment to the transmit power may allow a system designer to compensate when a high or a low value for the BER was determined. Also, in some examples, an operating parameter such as a receiver threshold for Rx 120 to receive data, may be adjusted. The receiver threshold may be adjusted to also allow the system designer to compensate when a high or a low value for the BER was determined. This disclosure is not limited to only the above-mentioned examples of adjustments to operating parameters but may include any number of adjustments to operating parameters based on determined BERs.

Continuing to decision block 650 (Determine Another BER?), the process determines (e.g., via determine feature 416) whether another BER is to be determined. Processing continues from decision block 650 back to block 640 if another BER is to be determined. In some examples, a system designer may only be interested in a given number of communication channel correlation coefficients and/or input signal-to-noise ratios operating parameters. Until the given number is reached, additional BERs may be determined. Otherwise, processing continues from decision block 650 to block 660.

In block 660 (End BER Determination), BER determination is complete. In some examples, a chart such as the example chart 500 depicted in FIG. 5 may be generated from determined BERs that are based on a range of communication channel correlation coefficients for communication channel 130 and input signal-to-noise ratios for receiver 120.

FIG. 7 illustrates a block diagram of an example computer program product 700. In some examples, as shown in FIG. 7, computer program product 700 includes a signal bearing medium 702 that may also include instructions 704. Instructions 704 may be for determining a BER associated with a receiver decoding data encoded in a first symbol and a second symbol, the first and the second symbols further included in both a first chip block and a second chip block. The first chip block and the second chip block may have been transmitted over a communication channel during a first symbol period through a first antenna and a second antenna of a transmitter. The first chip block and the second chip block may have also been transmitted over the communication channel during a second symbol period through the first antenna and the second antenna of the transmitter. Instructions 704, which, when executed by logic (e.g., BER logic 410), may cause the logic to obtain an input signal-to-noise ratio operating parameter for the receiver (e.g., receiver 120) to receive the encoded data via the communication channel (e.g., communication channel 130) during the first symbol time period and the second symbol time period. Instructions 704 may also cause the logic to obtain a channel correlation coefficient for the communication channel. The channel correlation coefficient may be based on a variation of the communication channel between the first symbol time period and the second symbol time period. Instructions 704 may also cause the logic to determine a BER associated with the receiver decoding the received data encoded in the first symbol and the second symbol and included in both the first chip block and the second chip block. The BER may be determined based on the input signal-to-noise ratio operating parameter and the channel correlation coefficient.

Also depicted in FIG. 7, in some examples, computer product 700 may include one or more of a computer readable medium 706, a recordable medium 708 and a communications medium 710. The dotted boxes around these elements depict different types of mediums included within, but not limited to, signal bearing medium 702. These types of mediums may distribute instruction 704 to be executed by logic (e.g., BER logic 410). Computer readable medium 706 and recordable medium 708 may include, but are not limited to, a flexible disk, a hard disk drive (HDD), a Compact Disc (CD), a Digital Video Disk (DVD), a digital tape, a computer memory, etc. Communications medium 710 may include, but is not limited to, a digital and/or an analog communication medium (e.g., a fiber optic cable, a waveguide, a wired communication link, a wireless communication link, etc.).

Figure 8:
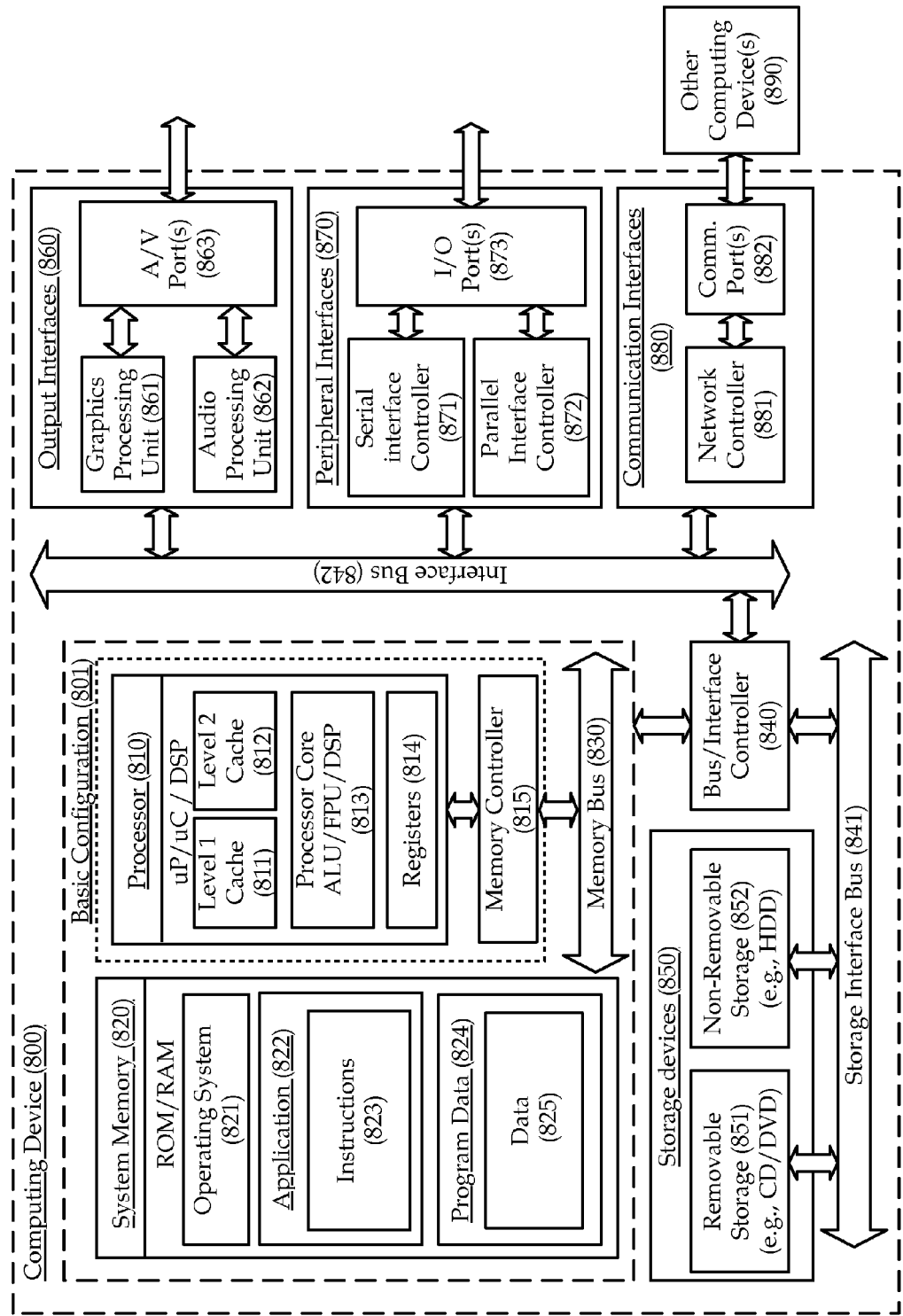
FIG. 8 illustrates an example computing device, all arranged in accordance with the present disclosure.

FIG. 8 is a block diagram illustrating an example computing device 800. In some examples, computing platform 140 depicted in FIG. 1 may be implemented on computing device 800. In these examples, elements of computing device 800 may be arranged or configured to determine a BER associated with a receiver decoding data transmitted from transmitter via a communication channel. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor ($\mu$P), a microcontroller ($\mu$C), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes instructions 823 that are arranged to perform the functions as described herein including the actions described with respect to quality manager 142 architecture shown in FIG. 4 or including the actions described with respect to the flow chart shown in FIG. 6. Program Data 824 includes data 825 that is useful for implementing instructions 823 (e.g., BER determination equations, communication channel correlation coefficients, input signal-to-noise ratio operating parameters, channel models, etc.). In some examples, application 822 can be arranged to operate with program data 824 on an operating system 821 such that implementations of determining a BER associated with a receiver decoding data transmitted from transmitter via a communication channel may be provided as described herein. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 860 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for determining a bit error rate associated with a receiver decoding data encoded in a first symbol and a second symbol, the first symbol and the second symbol further included in both a first chip block and a second chip block, the first chip block and the second chip block transmitted over a communication channel during a first symbol time period through a first antenna and a second antenna of a transmitter, the first chip block and the second chip block also transmitted over the communication channel during a second symbol time period through the first antenna and the second antenna of the transmitter, the method comprising:

obtaining an input signal-to-noise ratio operating parameter for the receiver to receive the encoded data via the communication channel during the first symbol time period and the second symbol time period;

obtaining a channel correlation coefficient for the communication channel, the channel correlation coefficient based on a variation of the communication channel between the first symbol time period and the second symbol time period; and determining the bit error rate associated with the receiver decoding data encoded in the first symbol and the second symbol, wherein the bit error rate is determined based on the input signal-to-noise ratio operating parameter and the channel correlation coefficient.

2. The method according to claim 1, wherein the first chip block and the second chip block to both include the first symbol and the second symbol comprises the first chip block and the second chip block to both include the first symbol and the second symbol based on a first orthogonal spreading code and a second orthogonal spreading code.

3. The method according to claim 1, wherein the communication channel is established based on direct-sequence code-division-multiple-access (DS-CDMA).

4. The method according to claim 1, wherein the communication channel is characterized as a time varying and frequency flat Rayleigh fast fading communication channel.

5. The method according to claim 4, wherein the communication channel is further characterized using a Jakes' channel model to characterize the communication channel in relation to the first antenna and to characterize the communication channel in relation to the second antenna.

6. The method according to claim 1, wherein obtaining the channel correlation coefficient for the communication channel comprises obtaining the channel correlation coefficient based on the variation of the communication channel between the first symbol time period and the second symbol time period being at least partially correlated.

7. The method according to claim 6, wherein the variation of the communication channel between the first symbol time period and the second symbol time period being at least partially correlated comprises the channel correlation coefficient as a value greater than 0 and less than 1.

8. The method according to claim 7, wherein determining the bit error rate associated with the receiver decoding data encoded in the first symbol and the second symbol comprises implementing an equation for determining a value for $P_b$ to represent the bit error rate, the equation to include:

$$P_b = \frac{(1-\rho^2)}{8\rho^3}[(1-\rho)(1-\gamma_1) - (1+\rho)(1-\gamma_2)] + \frac{1}{16\rho^2}[(1+\rho)^2(1-\gamma_2)^2(2+\gamma_2) + (1-\rho)^2(1+\gamma_1)^2(2-\gamma_1)]$$

wherein, $$\gamma_1 = \sqrt{\frac{1}{1+\frac{1}{\gamma_o(1-\rho)}}} \text{ and } \gamma_2 = \sqrt{\frac{1}{1+\frac{1}{\gamma_o(1+\rho)}}},$$

and wherein $\rho$ represents the channel correlation coefficient, $\gamma_o$ represents the input signal-to-noise ratio operating parameter, $\gamma_1$ represents an input signal-to-noise ratio during the first symbol time period, and $\gamma_2$ represents an input to signal-to-noise ratio during the second symbol time period.

9. A computing platform to determine a bit error rate associated with a receiver decoding data encoded in a first symbol and a second symbol, the first symbol and the second symbol further included in both a first chip block and a second chip block, the first chip block and the second chip block transmitted over a communication channel during a first symbol time period through a first antenna and a second antenna of a transmitter, the first chip block and the second chip block also transmitted over the communication channel during a second symbol time period through the first antenna and the second antenna of the transmitter, the computing platform comprising:

a quality manager, the quality manager to include logic configured to:

obtain an input signal-to-noise ratio operating parameter for the receiver to receive the encoded data via the communication channel during the first symbol time period and the second symbol time period;

obtain a channel correlation coefficient for the communication channel, the channel correlation coefficient based on a variation of the communication channel between the first symbol time period and the second symbol time period; and determine the bit error rate associated with the receiver decoding data encoded in the first symbol and the second symbol, wherein the bit error rate is determined based on the input signal-to-noise ratio operating parameter and the channel correlation coefficient.

10. The computing platform according to claim 9, wherein the first chip block and the second chip block to both include the first symbol and the second symbol comprises the first chip block and the second chip block to both include the first symbol and the second symbol based on a first orthogonal spreading code and a second orthogonal spreading code.

11. The computing platform according to claim 9, wherein to obtain the channel correlation coefficient for the communication channel comprises to obtain the channel correlation coefficient based on the variation of the communication channel between the first symbol time period and the second symbol time period being at least partially correlated.

12. The computing platform according to claim 11, wherein the variation of the communication channel between the first symbol time period and the second symbol time period being at least partially correlated comprises the channel correlation coefficient as a value greater than 0 and less than 1.

13. The computing platform according to claim 12, wherein to determine the bit error rate associated with the receiver decoding data encoded in the first symbol and the second symbol comprises the logic configured to implement an equation to determine a value for $P_b$ to represent the bit error rate, the equation to include:

$$P_b = \frac{(1-\rho^2)}{8\rho^3}[(1-\rho)(1-\gamma_1) - (1+\rho)(1-\gamma_2)] + \frac{1}{16\rho^2}[(1+\rho)^2(1-\gamma_2)^2(2+\gamma_2) + (1-\rho)^2(1+\gamma_1)^2(2-\gamma_1)]$$

wherein, $$\gamma_1 = \sqrt{\frac{1}{1 + \frac{1}{\gamma_o(1-\rho)}}} \text{ and } \gamma_2 = \sqrt{\frac{1}{1 + \frac{1}{\gamma_o(1+\rho)}}},$$

and wherein $\rho$ represents the channel correlation coefficient, $\gamma_0$ represents the input signal-to-noise ratio operating parameter, $\gamma_1$ represents an input signal-to-noise ratio during the first symbol time period, and $\gamma_2$ represents an input to signal-to-noise ratio during the second symbol time period.

14. A wireless communication system comprising:

a transmitter having a first antenna and a second antenna, the transmitter including logic configured to encode data in a first symbol and a second symbol and separately include the first symbol and the second symbol in a first chip block and also in a second chip block, wherein the transmitter is configured such that the first chip block and the second chip block are transmitted over a communication channel during a first symbol time period through the first antenna and the second antenna, the transmitter is also configured such that the first chip block and the second chip block are also transmitted over the communication channel during a second symbol time period through the first antenna and the second antenna, the first chip block and the second chip to be transmitted to a receiver via the communication channel; and a computing platform having a quality manager, the quality manager to include logic configured to:

obtain an input signal-to-noise ratio operating parameter for the receiver to receive the encoded data via the communication channel during the first symbol time period and the second symbol time period;

obtain a channel correlation coefficient for the communication channel, the channel correlation coefficient based on a variation of the communication channel between the first symbol time period and the second symbol time period; and determine a bit error rate associated with the receiver decoding data encoded in the first symbol and the second symbol, wherein the bit error rate is determined based on the input signal-to-noise ratio operating parameter and the channel correlation coefficient.

15. The wireless communication system according to claim 14, wherein to encode data in a first symbol and a second symbol and separately include the first symbol and the second symbol in a first chip block and also in a second chip block comprises to separately include the first symbol and the second symbol in the first chip block and also in the second chip block based on a first orthogonal spreading code and a second orthogonal spreading code.

16. The wireless communication system according to claim 14, wherein to obtain the channel correlation coefficient for the communication channel comprises to obtain the channel correlation coefficient based on the variation of the communication channel between the first symbol time period and the second symbol time period being at least partially correlated.

17. The wireless communication system according to claim 16, wherein the variation of the communication channel between the first symbol time period and the second symbol time period being at least partially correlated comprises the channel correlation coefficient as a value greater than 0 and less than 1.

18. The wireless communication system according to claim 14, wherein an operating parameter for the transmitter is adjusted based on the determined bit error rate.

19. A wireless communication system for processing signals transmitted by a transmitter over a communication channel, wherein the transmitter includes a first antenna and a second antenna, the wireless communication system comprising:

a receiver including logic configured to receive signals from the transmitter via the communication channel and also configured to decode data from received signals, wherein the data is decoded from a first symbol and a second symbol during a second symbol time period included in both a first chip block and a second chip block, the first chip block and the second chip block transmitted over the communication channel during a first symbol time period from the first antenna and the second antenna at the transmitter, the first chip block and the second chip block also transmitted over the communication channel during a second symbol time period from the first antenna and the second antenna at the transmitter;

a computing platform having a quality manager, the quality manager including logic configured to:

obtain an input signal-to-noise ratio operating parameter for the receiver to receive the encoded data via the communication channel during the first symbol time period and the second symbol time period;

obtain a channel correlation coefficient for the communication channel, the channel correlation coefficient based on a variation of the communication channel between the first symbol time period and the second symbol time period; and determine a bit error rate associated with the receiver decoding data encoded in the first symbol and the second symbol, wherein the bit error rate is determined based on the input signal-to-noise ratio operating parameter and the channel correlation coefficient.

20. The wireless communication system according to claim 19, wherein the first chip block and the second chip block to both include the first symbol and the second symbol comprises the first chip block and the second chip block to both include the first symbol and the second symbol based on a first orthogonal spreading code and a second orthogonal spreading code.

21. The wireless communication system according to claim 19, wherein to obtain the channel correlation coefficient for the communication channel comprises to obtain the channel correlation coefficient based on the variation of the communication channel between the first symbol time period and the second symbol time period being at least partially correlated.

22. The wireless communication system according to claim 21, wherein the variation of the communication channel between the first symbol time period and the second symbol time period being at least partially correlated comprises the channel correlation coefficient as a value greater than 0 and less than 1.

23. The wireless communication system according to claim 19, wherein an operating parameter for the receiver is adjusted based on the determined bit error rate.

24. A computer program product comprising a non-transitory signal bearing medium having instructions for determining a bit error rate associated with a receiver decoding data encoded in a first symbol and a second symbol, the first symbol and the second symbol further included in both a first chip block and a second chip block, the first chip block and the second chip block transmitted over a communication channel during a first symbol time period through a first antenna and a second antenna of a transmitter, the first chip block and the second chip block also transmitted over the communication channel during a second symbol time period through the first antenna and the second antenna of the transmitter, which, when executed by logic, cause the logic to:

obtain an input signal-to-noise ratio operating parameter for the receiver to receive the encoded data via the communication channel during the first symbol time period and the second symbol time period;

obtain a channel correlation coefficient for the communication channel, the channel correlation coefficient based on a variation of the communication channel between the first symbol time period and the second symbol time period; and determine the bit error rate associated with the receiver decoding data encoded in the first symbol and the second symbol, wherein the bit error rate is determined based on the input signal-to-noise ratio operating parameter and the channel correlation coefficient.

25. The computer program product according to claim 24, wherein the first chip block and the second chip block to both include the first symbol and the second symbol comprises the first chip block and the second chip block to both include the first symbol and the second symbol based on a first orthogonal spreading code and a second orthogonal spreading code.

26. The computer program product according to claim 24, wherein to obtain the channel correlation coefficient for the communication channel comprises to obtain the channel correlation coefficient based on the variation of the communication channel between the first symbol time period and the second symbol time period being at least partially correlated.

27. The computer program product according to claim 26, wherein the variation of the communication channel between the first symbol time period and the second symbol time period being at least partially correlated comprises the channel correlation coefficient as a value greater than 0 and less than 1.

28. The computer program product according to claim 27, wherein to determine the bit error rate associated with the receiver decoding data encoded in the first symbol and the second symbol comprises the logic to implement an equation to determine a value for $P_b$ to represent the bit error rate, the equation to include:

$$P_b = \frac{(1-\rho^2)}{8\rho^3}[(1-\rho)(1-\gamma_1) - (1+\rho)(1-\gamma_2)] +$$

$$\frac{1}{16\rho^2}[(1+\rho)^2(1-\gamma_2)^2(2+\gamma_2) + (1-\rho)^2(1+\gamma_1)^2(2-\gamma_1)]$$

wherein, $$\gamma_1 = \sqrt{\frac{1}{1 + \frac{1}{\gamma_o(1-\rho)}}} \text{ and } \gamma_2 = \sqrt{\frac{1}{1 + \frac{1}{\gamma_o(1+\rho)}}},$$

and wherein $\rho$ represents the channel correlation coefficient, $\gamma_0$ represents the input signal-to-noise ratio operating parameter, $\gamma_1$ represents an input signal-to-noise ratio during the first symbol time period, and $\gamma_2$ represents an input to signal-to-noise ratio during the second symbol time period.

29. The computer program product according to claim 24, wherein an operating parameter for the transmitter is to be adjusted based on the determined bit error rate.

30. The computer program product according to claim 24, wherein an operating parameter for the receiver is to be adjusted based on the determined bit error rate.

* * * * *

UNITED STATES PATENT AND TRADEMARK OFFICE
CERTIFICATE OF CORRECTION

PATENT NO. : 8,355,426 B2  
APPLICATION NO. : 12/430788  
DATED : January 15, 2013  
INVENTOR(S) : Bar-Ness et al.

Page 1 of 2

It is certified that error appears in the above-identified patent and that said Letters Patent is hereby corrected as shown below:

On the Title Page, in Item (56), under "FOREIGN PATENT DOCUMENTS", in Column 2, Line 1, delete "EP 1422862 A1 5/2004".

On the Title Page, in Item (56), under "FOREIGN PATENT DOCUMENTS", in Column 2, Line 3, delete "WO 0199329 A1 12/2001".

On the Title Page, in Item (56), under "FOREIGN PATENT DOCUMENTS", in Column 2, Line 5, delete "WO 2008054172 A2 5/2008".

On the Title Page, in Item (56), under "FOREIGN PATENT DOCUMENTS", in Column 2, Line 7, delete "WO 2008088194 A1 7/2008".

On the Title Page 2, in Item (56), under "OTHER PUBLICATIONS", in Column 2, Line 5, delete "Ber" and insert -- BER --, therefor.

In the Drawings:

In Fig. 8, Sheet 7 of 7, under "Processor (810)", delete "uP/uC" and insert -- $\mu P/\mu C$ --, therefor.

In the Specification

In Column 6, Line 53, delete "receiver 110" and insert -- receiver 120 --, therefor.

In Column 8, Line 57, in Equation (2), delete " $x_2 = s_2 c_1 + s_1 c_2$ " and insert -- $x_2 = s_2 c_1^* + s_1^* c_2$ --, therefor.

Signed and Sealed this  
Eleventh Day of June, 2013

Teresa Stanek Rea  
*Acting Director of the United States Patent and Trademark Office*

CERTIFICATE OF CORRECTION (continued)
U.S. Pat. No. 8,355,426 B2

In Column 9, Line 49, delete "$a_{k+1}^2 = |h_1^{(k+1)}|^2 + |h_2^{(k+1)}|^2.$" and insert -- $\alpha_{k+1}^2 = \left|h_1^{(k+1)}\right|^2 + \left|h_2^{(k+1)}\right|^2.$ --, therefor.

In Column 10, Line 27, in Equation (11), delete "$f(\mu_2)$" and insert -- $f(\mu_2)$ --, therefor.

In Column 10, Line 53, in Equation (13), delete " " and insert --  --, therefor.

In Column 12, Line 25, delete "receiver 110" and insert -- receiver 120 --, therefor.

In Column 12, Line 29, delete "receiver 110" and insert -- receiver 120 --, therefor.

In Column 12, Line 30, delete "receiver 110." and insert -- receiver 120. --, therefor.

In Column 12, Line 29, delete "receiver 110" and insert -- receiver 120 --, therefor.